(12) United States Patent
Schlegel

(10) Patent No.: US 7,407,588 B2
(45) Date of Patent: Aug. 5, 2008

(54) METHOD OF USING STABLE ADSORBER GRANULES TO REMOVE POLLUTANTS FROM FLOWABLE MEDIA

(75) Inventor: Andreas Schlegel, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 165 days.

(21) Appl. No.: 11/097,808

(22) Filed: Apr. 1, 2005

(65) Prior Publication Data

US 2005/0247636 A1    Nov. 10, 2005

(30) Foreign Application Priority Data

Apr. 3, 2004    (DE) .................. 10 2004 016 601

(51) Int. Cl.
*C02F 1/42* (2006.01)
(52) U.S. Cl. ..................... 210/688; 210/912
(58) Field of Classification Search .............. 210/688, 210/912
See application file for complete search history.

(56) References Cited

U.S. PATENT DOCUMENTS

| | | | |
|---|---|---|---|
| 5,911,882 A | 6/1999 | Benjamin | |
| 6,012,232 A | 1/2000 | Weyrauch | |
| 6,099,728 A | 8/2000 | Bairischer | |
| 6,809,062 B2 | 10/2004 | Driehaus | |
| 2002/0053547 A1 | 5/2002 | Schlegel | |
| 2006/0186052 A1* | 8/2006 | Seidel et al. | ................ 210/688 |

FOREIGN PATENT DOCUMENTS

| | | |
|---|---|---|
| DE | 4304536 | 8/1994 |
| DE | 4320003 | 12/1994 |
| DE | 19615102 | 10/1997 |
| DE | 19826186 | 12/1999 |
| DE | 19915829 | 10/2000 |
| GB | 2346568 | 8/2000 |

OTHER PUBLICATIONS

Benjamin, M. M., et al.; *Sorption and filtration of metals using iron-oxide-coated sand*, Water Research, Pergamon Press, Oxford, GB, Bd. 30, Nr. 11, Nov. 1996.

Zhou, P., et al.; *Heavy metal removal from wastewater in fluidized bed reactor*, Water Research, Pergamon Press, Oxford, GB, Bd. 33, Nr. 8, Jun. 1999.

R.W. Bunsen, A.A. Berthold, 2nd edition, Göttengen, 1837. "Eisenoxydhydrat".

*Solid-Liquid Filtration and Separation Technology*, A. Rushton, A.S., Ward R.G., Holdich, 2nd edition 2000, Wiley-VCH, Weinheim and also Hanbuch der Industriellen Fest/Flussig-Filtration [Handbook of Industrial Solid/Liquid Filtration], H. Gasper, D. Ochsle, E. Pongratz, 2nd edition 2000, Wiley-VCH Weinheim.

* cited by examiner

*Primary Examiner*—Chester T. Barry
(74) *Attorney, Agent, or Firm*—Nicanor A. Kohncke

(57) ABSTRACT

The present invention relates to stable adsorber granules which have a high mechanical stability, and also to the use thereof.

26 Claims, 1 Drawing Sheet

Figure 1:
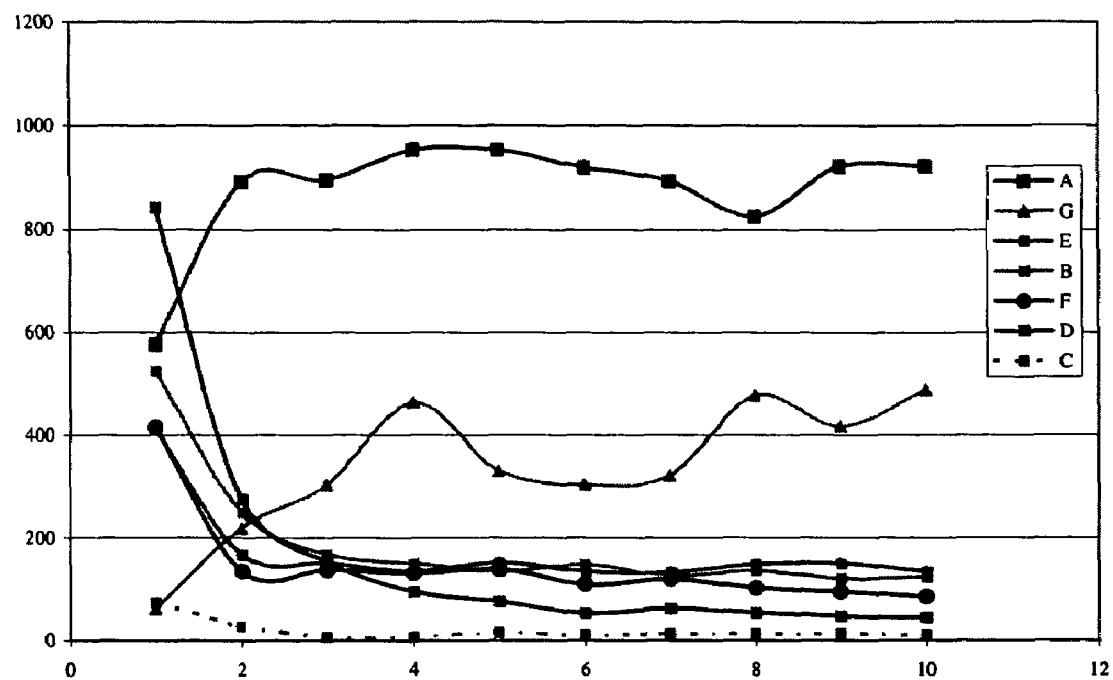

METHOD OF USING STABLE ADSORBER GRANULES TO REMOVE POLLUTANTS FROM FLOWABLE MEDIA

BACKGROUND OF THE INVENTION

1. Field of the Invention

The present invention relates to stable adsorber granules which haves high mechanical stability, and also to the use thereof.

2. Brief Description of the Prior Art

Catalyst and adsorber granules, also those based on iron oxides and/or iron oxyhydroxides have already been described. They are used predominantly in continuous processes, in which they are customarily found in tower- and column-like apparatuses through which the medium to be treated flows, where on the outer and inner surfaces of the granules and the accessible pores, the chemical and physical reaction and adsorption processes take place. For this purpose, pulverulent materials cannot be used, because they compress in the direction of flow of the medium and as a result incresse the flow resistance up to blocking of the apparatus.

If an apparatus is cleaned by back-flushing, large amounts of the powder are discharged, are lost, and lead to an intolerable pollution of the wastewater.

The flowing media, however, also exert forces on the granules which can lead to abrasion and/or movement up to vigorous agitation of the granules. As a result the granules impact one another and as a consequence unwanted abrasion results. This leads to loss of catalyst or adsorber material and to contamination of the medium to be treated.

Iron oxide and iron hydroxide-containing adsorption media/reaction media can be used advantageously, for example in the sector of water purification or gas purification. In the case of water purification, this composition is used in filters or adsorber columns through which flow passes horizontally or vertically, or, by addition to the water to be treated for the precipitation of dissolved, suspended or emulsified organic or inorganic phosphorus, arsenic, antimony, sulphur, selenium, tellurium, beryllium and also cyano and heavy metal ions and compounds from, for example, drinking water, service water, process water, industrial wastewater, domestic wastewater, pit water, mineral water, holy water, thermal water and therapeutic water and also aquarium water, garden pond water and agricultural water. Use is also possible in what are termed reactive walls for precipitating the said pollutants from groundwater conduits and leachate water conduits from contaminated sites such as landfills.

In gas cleaning, the composition is used in adsorbers for binding unwanted constituents such as hydrogen sulphide, mercaptans and prussic acid, and also other phosphorus, arsenic, antimony, sulphur, selenium, tellurium and cyano and heavy metal compounds in off-gases. It is also possible to adsorb gases such as HF, HCl, $H_2S$, $SO_x$, $NO_x$.

It is also possible to remove phosphorus, arsenic, antimony, selenium, tellurium and also cyano and heavy metal compounds from used oils and other contaminated organic solvents.

Catalyst granules and adsorber granules based on iron oxides and/or iron oxyhydroxides are also used for the catalysis of chemical reactions in the gas phase or in the liquid phase.

Various processes are also known for removing the trace substances and pollutants from aqueous systems using adsorption media.

For water treatment, preferably continuously operated adsorbers are used which are frequently operated in groups arranged in parallel. To free, for example, drinking water from organic impurities, such adsorbers are charged with activated carbon.

As regards the removal of pollutants such as arsenic from water, iron oxides and/or iron oxyhydroxides are superior to all other known adsorption media. The adsorption of arsenic compounds by iron hydroxide gel has been known for a relatively long time (R. W. Bunsen, A. A. Berthold, 2nd edition, Göttingen, 1837).

DE 4 320 003 A1 describes a process for removing dissolved arsenic by means of solid iron(III) hydroxide.

WO 02/47811 A1 describes a process for producing an iron-containing sorption material with pressure elevation at a temperature below 5° C.

DE 4 320 003 A1 and WO 02/47811 A1 disclose the use of granulated iron hydroxide as adsorber material for a fixed-bed reactor. The granulated iron hydroxide is produced via a freeze-conditioning (freeze drying) of iron hydroxide obtained by neutralization of acidic iron(III) salt solutions at temperatures below minus 5° C. This production process is energetically costly to a great extent and leads to highly salt-polluted wastewaters. Furthermore, as a result of this production process, a very broad particle size spectrum is obtained which also comprises very small particles of low mechanical stability. In the case of use in a fixed-bed reactor, this leads to the grain size spectrum being significantly decreased in the course of the operation due to mechanical abrasion of the particles, which in turn causes finely dispersed particles of loaded or unloaded adsorption medium to be discharged from the reactor. A further disadvantage of these granules is that the adsorption capacity towards arsenic compounds is considerably reduced if the granules lose water, for example owing to a relatively log dry idle time. If the granules are delivered, for example, in the moist state, they have a tendency to stick and are difficult to transport.

In addition the stability of the granules decreases with a high water content which becomes noticeable as an adverse aspect in particular in transport. A high water content also increases the transport costs of the medium. Moist medium offers, in addition, an ideal nutrient base for bacteria which can be washed out into the drinking water during operation. If moist medium comes onto the market, care must be taken that it does not lose moisture in an uncontrolled manner, for instance in drying in air or in the sun, as otherwise the mode of action can be lost and the granule size distribution as a result of shrinkage, and the bulk density, are no longer reliable.

Furthermore, it is known that ageing, for example of amorphous $Fe(OH)_3$ proceeds more rapidly in the aqueous environment than in the dry state. Associated therewith is crystallization and possibly a reduction of the adsorption capacity and stability.

A further disadvantage in this process has proved in practice to be the quality of the granulated material, because the material is comparatively soft and fine-grained. As a result, during backwashing of the filter charged with the material, a considerable material loss occurs. Therefore, at each backwashing, new material must be added, as a result of which the expenditure for carrying out the process is considerably increased. In addition, the water or wastewater to be treated must be relatively clean, since otherwise precipitates of solid constituents of the water on the granules occur due to the filter action and thus the removal of the desired constituents is impaired.

The iron oxide granules or iron oxyhydroxide granules described in WO 92/126630 A1 and WO 02/12663 A1, however, are outstandingly suitable for use in fixed-bed adsorbers.

The fines fraction which is possibly abraided off from the granules by improper mechanical stress of the granules is discharged from the bed from time to time by backwashing together with algae, iron flakes and other fines fractions originating from the groundwater and is collected in a separate vessel end sedimented there. However, in closed water purification containers, for example cartridges or sieve baskets, such a separate extraction of the fines fraction, which could contaminate the treated water, is not possible without further steps. Closed water purification containers comprise the adsorption medium in a bed.

Since the described granules and also the inventive granules can be free from foreign binders, the material is comparatively simple to dispose of after use.

However, the stability of compacted powders is unsatisfactory with relatively long use in adsorbers, and is in need of improvement. Therefore, these formulations come into consideration for use in adsorbers, for example, in particular continuously operated adsorbers, in the purification of water, only with restrictions. In particular in the maintenance or cleaning of the adsorber units by backwashing (see below), such granules, owing to the associated agitation, lose the same large amounts of substance. The backwashing wastewater is highly turbid as a result of the abrasion. This is not acceptable for a plurality of reasons: first, adsorber material is lost which is heavily loaded with impurities after a relatively long service life and is therefore toxicologically harmful. Then, the wastewater stream is polluted with the abraded material which can sediment and thus leads to impairment of the piping systems, and finally the sewage treatment plant is undesirably loaded physically and toxicologically, to name only some reasons.

Frequently, the problem is encountered, especially in regions where well water, mains water or drinking water in general is polluted with arsenic or other heavy metals, that no suitable drinking water treatment plant is available in the vicinity or no suitable system is available which would continuously remove the pollutants.

The company Brita Wasser-Filter-Systeme GmbH has disclosed, for example, cartridges and apparatuses for treating liquids (DE 19 905 601 A1; DE 19 915 829 A1; DE 19 814008 A1, DE 19 615 102 A1, DE 4 304536 A1, U.S. Pat. No. 6,099,728). These apparatuses are very suitable for the complete or partial desalination of drinking water in domestic jugs immediately before use of the drinking water. However, for the easy handleability of the granules in transport, on changing or charging the adsorber tanks, it is necessary that the granules have as low a moisture content as possible, since these otherwise have a tendency to stick together and can no longer flow freely.

The object underlying the present invention, therefore, is to produce improved granules based on iron hydroxide, which granules have a high mechanical stability combined with a high binding capacity for pollutants present in liquids and gases and which have flowability and low water content and which achieve sufficient mechanical stability even without organic binders or inorganic foreign binders.

SUMMARY OF THE INVENTION

This object has been achieved by granules consisting essentially of iron oxide and/or iron oxyhydroxide which have a turbidity value by the turbidity test of <600 FNU.

DETAILED DESCRIPTION OF THE INVENTION

The granules preferably have a turbidity value by the turbidity test of <300 FNU, preferably <200 FNU.

The granules preferably have an abrasion value by the abrasion test of <10%. More preferably, the granules have an abrasion value by the abrasion test of <5%, very particularly preferably of <1.5%.

The inventive granules are considerably more load bearing and thus have a much greater abrasion stability towards mechanical and hydraulic loading.

All previously known solid adsorption media exhibit, even after repeated mechanical loading, continuous abrasion which leads to an unacceptable red to brown colouration of the water passing through. For this reason, an abrasion test and a turbidity test were developed which take into account the actual requirements of stability of the adsorption media.

The mechanical and hydraulic abrasion strength was evaluated by the following methods:

Turbidity Test

An improved test of granule stability which likewise approximates the real requirements in cartridge applications is the turbidity measurement of the supernatant suspension after mechanical agitation of the granules in water. The turbidity measurement is an important method in water, wastewater and sludge examination.

10 g of granules are weighed into a 250 ml "Duran®" glass bottle with scale, Schott, article No. 21801365 and made up to 150 ml with deionized $H_2O$. The bottle is then clamped into the LabShaker Kühner model, Braun-Melsungen laboratory shaker and shaken for 30 min at 250 rpm at room temperature. This procedure is termed one abrasion cycle. The bottle contents are then allowed to stand for 1 min (sedimentation) and are then decanted off through a 200 mm round sieve from Retsch having a 40 μm sieve mesh. The filtrate which has passed through the sieve is subjected to the turbidity measurement. For the turbidity measurement by measurement method EN ISO 7027:1999, a laboratory turbidity photometer "Nephla" from Dr. Lange, was used. Measurement method: 90° light-scattering photometry, wavelength: 860 nm; standard: DIN standard formazine; ambient temperature: 20-25° C.; calibration was performed with reference to the light scattering of formazine in turbidity units formazine (TU/F) which, however, are reported more accurately as FNU (formazine nephelometric units). The turbidity value (dimension: TU/F="turbidity unit formazine" or FNU="formazine nephelometric units") is plotted against the number of abrasion cycles. For the present invention, the measurement of turbidity after the 5th passage was chosen as invention characteristic. Within the meaning of the turbidity test, only those granules are considered to be abrasion stable which do not exceed a certain claimed turbidity value even in each of five sequential abrasion cycles. A sample of deionized water with which the inventive granules are brought into contact has, for example, a turbidity of 0.37 FNU.

The inventive granules, even after the severe mechanical loading, exhibit no abrasion which leads to unwanted turbidity of the supernatant solution (FIG. 1).

Abrasion Test 10 g of the granules to be studied having particle sizes >0.5 mm and moistures ≦5% were weighed into a 250 ml "Duran®" glass bottle with scale, Schott, article No. 21801365, admixed with 150 ml of deionized water and rotated at room temperature over a period of 30 minutes at 250 revolutions/minute on a LabShaker shaking machine (Kühner model, from Braun-Melsungen). Then, from the suspension, the fines fraction <0.1 mm was isolated by means of a sieve, dried to a moisture ≦5% and weighed. The weight ratio between end weight and initial weight determines the abrasion value x in %. x(%)=[100× end weight of fines fraction (g)/initial weight of granules (g)].

The same results for abrasion and turbidity were achieved when a modem bench shaking machine "Lab-Shaker", Kühner A G, type LSR-V-25, shaking frequency 250 revolutions/minute with digital frequency display (+/−1 rpm) is used.

The granules preferably have $\alpha$-, $\beta$-, $\gamma$ and/or $\delta$-FeOOH phases and/or $Fe(OH)_2$-phases, ferrihydrite- and also mixed- and intermediate phases of the same. Particularly preferably, the granules, in addition to iron oxide and/or iron oxyhydroxides, comprise iron carbonates and/or the iron oxide and/or iron oxyhydroxide are solidified with oxides and/or /(oxy)hydroxides with the elements Al, Mg, Ti.

Suitable compounds for the inventive use of finely divided iron oxyhydroxides are, for example, transparent iron oxyhydroxide pigments having a mean particle size of less than 0.1 μm and specific surface areas of greater than 80 m². However, correspondingly finely divided iron oxide pigments can also be used, preferably haematites, magnetites or maghaemites.

The granules preferably have a water content of <50%, preferably <20%, very particularly preferably <10%. The moisture or water content is determined by drying a sample in the circulated air drying cabinet at 70-100° C. to constant weight. The difference between initial weight and end weight determines the moisture content.

The particle size of the material is optional, it is preferably between 0.1 and 40 mm, particularly preferably between 0.2 to 20 mm. This can be achieved by mechanical shaping of the semisolid, pasty filtercake before drying by a granulating or pelleting plant or in an extrusion press to give shaped bodies having a size in the range between 0.2 and 20 mm and subsequent drying in air, on a belt dryer or in a drying cabinet, and/or by mechanical comminution to the desired particle size after drying. Thereafter, the granules preferably have a particle size of 0.01 to 5 mm, preferably from 0.1 to 1 mm. If the granules are produced by spray drying, they preferably have a particle size of <0.3 mm, in particular of <0.2 mm. The particle size determination is carried out using the Mastersizer instrument from Malvern Instruments.

The granules preferably have a primary particle size of up to 100 nm, preferably from 4 to 50 nm. The primary particle size is determined here from scanning electron micrographs by measurement (instrument: XL 30 ESEM FEG, Philips).

The granules preferably have a BET surface area of >100 m²/g, in particular >250 m²/g. The specific surface area of the inventive products by BET is determined via the carrier gas method ($He:N_2$=90:10) by the one-point method as specified in DIN 66131 (1993). Before the measurement, the sample is heated for 1 h at 140° C. in a dry nitrogen current.

For easy handleability of the granules in transport, in changing or charging the adsorber tanks, it is in addition necessary that the granules have as low a moisture content as possible, since they otherwise have a tendency to stick together and can no longer flow freely. The granules are therefore preferably flowable. The free flowability (flow test) is determined by uniformly distributing a sample of 25 g into a Haver&Boecker sieve analysis machine of Haver EML200 digital plusN type on a DIN round sieve of diameter 200 mm having a mesh width which corresponds to the upper limit of the particle size distribution of the product and sieving by means of an amplitude of 0.3 mm. A sample is flowable when the granules are at least >95% sieved within 1 min.

Although not defined as a flow test within the meaning of the application, the free flowability of the granules can also be recognized by measuring the time in which a granule volume of 100 ml freely trickles through a DIN outflow beaker as specified in DIN EN ISO 2431:1996, outlet orifice of 8 mm in diameter, until it is completely empty.

It has been found that the inventive granules have a high binding capacity for pollutants present in bodies of water, liquids or gases, and they in addition have sufficiently high stability against mechanical or hydraulic stress due to flowing media.

The granules preferably have an arsenic adsorption by the arsenic adsorption test of >55%, in particular >80%.

Arsenic Adsorption Test

To measure the adsorption of arsenic(V), in a 5 l PE bottle, 3 l of an aqueous solution of $Na_2HAsO_4$ are treated over a defined period at a pH of approximately 8 with 3 g of the sample under test at the concentration indicated respectively of approximately 2.5-3 mg/l of arsenic, and the bottle is agitated on rotating rollers at room temperature. After defined time intervals, about 50 ml of the solution are withdrawn, filtered through a cellulose acetate membrane filter having a pore size of 0.45μ, and the arsenic content thereof is measured. The adsorption of As ions to iron hydroxide is defined as the concentration of the $As^{5+}$ ions remaining in solution after 120 min, and is reported in the examples in %, in comparison with the reported initial concentration (=100%).

To measure the adsorption of $Cd^{2+}$ and $V^5+$, in a 5 l PE bottle, 3 l of an aqueous solution of $Cd(NO_3)_2$ and $NaVO_3$ are treated over a defined period at a pH of 7.5 with 3 g of the sample under test having the concentration reported in each case of approximately 2.4 mg/l of $Cd^{2+}$ or $V^{5+}$ and the bottle is rotated about its own longitudinal axis on rotating rollers ("Rollenbock") at 60 rpm at room temperature and thus agitated. After defined time intervals, about 50 ml of the solution are withdrawn, filtered through a cellulose acetate membrane filter having a pore size of 0.45μ, and the arsenic content thereof is measured. The adsorption of As ions to iron hydroxide is defined as the content of the heavy metal ions remaining in solution after 120 min and is reported in the examples in %, in comparison with the reported initial amount (=100%) in the same manner as for arsenic:

$x_1$ mg in solution in advance=100%;

$x_2$ mg after 120 min=Y %; adsorption after 120 min: Z %=100%−Y %.

The As and heavy metal contents of the loaded iron oxyhydroxide or of the solutions is determined via mass spectrometry (CIP-MS) as specified in DIN 38406-29 (1999) or via optical emission spectroscopy (ICP-OES) as specified in EN-ISO 11885 (1998) using in each case inductively conducted plasma as excitation unit.

To produce the inventive granules, first an aqueous suspension of finely divided iron oxyhydroxides and/or iron oxides is produced according to the prior art. A particularly advantageous benefit in practice proves to be synthesizing the finely divided iron oxyhydroxides by treating iron(II) salt solutions with NaOH and possibly air, because this synthesis method leads to particularly finely divided iron (oxy)hydroxides and thus to a high stability of the finished material in addition to high adsorption strength. Particularly preferred iron hydroxide compounds which meet these requirements are, however, those which are formed by hydrolysis of iron(III) compounds.

Iron oxyhydroxides having high specific surface areas can be produced, particularly preferably, by reaction of Fe(III) salts with base. Alkaline solution (NaOH, KOH, $NH_3$, $Na_2CO_3$, $Ca(OH)_2$) is added to an acidic $Fe^{3+}$ salt solution ($FeCl_3$, $Fe_2SO_4)_2$, $FeClSO_4$, $Fe(NO_3)_3$ or other dissolved salts) in accordance with the stoichiometry of the reaction $Fe^{3+} + 3\ OH^- \rightarrow Fe(OH)_3$, until the pH remains stable at pH 6-8, and $Fe(OH)_3$ has been precipitated quantitatively. In a preferred embodiment, the Fe(III) salt solution is precipitated only to an acid pH (particularly preferably: pH 4-7), so that Fe is not yet precipitated quantitatively, since the adsorption properties of the medium are improved at a slightly acid pH. The above described reactions can of course also be carried out in reverse sequence, and the acid pH set by an excess of $Fe^{3+}$ salts or by adding acid.

Modifiers, for example $SiO_2$, zinc salts, aluminium salts or magnesium salts, hydroxycarboxylic acids, phosphates, metaphosphates, can be added to the reactions. Modifiers or particular reaction conditions can increase the action of the iron hydroxide. In the case of the precipitation processes in the aqueous medium, according to previous knowledge, precipitations in the alkaline environment lead to granules which adsorb less well than those in the acidic environment. For example, ageing of $Fe(OH)_3$ to form crystalline FeOOH phases can also be controlled in a targeted manner by concentration and temperature.

Depending on reaction conditions, the phases δ-FeOOH, β-FeOOH, α-FeOOH, ferrihydrite may be obtained, which, depending on the degree of crystallinity, can have very high specific surface areas and therefore adsorb arsenic very well.

In poorly crystalline phases, the X-ray powder diffractogram shows broad reflections and in electron micrographs of a dispersed granule sample, finely divided particles having a diameter of some nanometers may be observed.

The finely divided iron hydroxide used has an irregular particle morphology. In the scanning electron micrographs, usually heaps of agglomerated, in part spherulitic particles may be seen. These individual particles have a diameter of approximately 50 nm. The BET surface area ranges from 50 to 500 m²/g, preferably from 150 to 350 m²/g.

The primary particle size was determined by measurement from scanning electron micrographs (instrument: XL 30 ESEM FEG, Philips). If the primary particles are needle-shaped, for example in the α-FeOOH phase, as a measure of the particle size the needle width may be reported. In the case of nanoparticulate α-FeOOH particles, needle widths of up to 100 nm are observed, but chiefly between 4 and 50 nm. By doping or special reaction conditions, the needle widths may be varied in their length:width ratio. If the primary particles are isometric, for example as in the ferrihydrite, δ-FeOOH, $α-Fe_2O_3$, $γ-Fe_2O_3$, $Fe_3O_4$, phases, the particle diameters can absolutely also be less than 20 nm.

As can be concluded from the X-ray powder diffractograms, the iron oxyhydroxides can be substantially amorphous or comprise ferrihydrite structures.

The water and constituents dissolved therein may be removed from the iron hydroxide compound suspension thus prepared in various ways. The simplest variant has proved to be complete removal of the water from the suspension, for example by spray-drying and subsequent extraction of the crystallized salts by redispersion of the solid mixture, followed by filtration, paste formation and/or granulation and drying.

For uses in which higher demands are made of the mechanical strength of the granules/catalysts, the suspension is filtered or centrifuged and the residue washed to be essentially salt free. It has been found that the stability of the granules described, even at a foreign salt content of up to 5%, still has sufficient stability. The (filter)cake which is obtained as residue is a solid to semisolid paste. This can then be completely or partly dewatered, and the resultant material can then be comminuted to the desired shape and/or size. The later use of the granules determines the preferred procedure in production thereof and can be determined by simple preliminary tests for the respective application by those skilled in the art. Not only the directly dried filtercake, but also the dried shaped bodies can then be used as catalyst or adsorber.

As other methods for producing granules, pelletizing a semimoist paste has proved itself. In this method pellets or rods are shaped from a semisolid paste, for example by means of a simple perforated sheet, a roller press or an extruder and these are dried either directly or these extrudates are additionally brought into spherical or granule shape by means of a pelletizer. The still moist beads or granules can be subsequently dried to any desired moisture content. In order that the granules do not clump together, a residual moisture content of <50%, preferably <30%, particularly preferably <20%, is recommended.

By means of spray granulation, for example very finely divided granules may be produced which provide a very high external catalyst surface area. At the outer grain surfaces, the first contacts with the dissolved ions take place. Although diffusion and adsorption processes of the ions into the pores and channels of the granules take place, this does not happen until after a certain contact time.

On account of their high density and abrasion stability, the spray granules may also be used in a filter system without significant pressure drop, which can also be used, for example, in upflow. A preferred use of these granules, however, is the use in cartridge cases which have a high adsorption capacity for arsenic and other pollutants for very short contact times, but at the same time must guarantee high abrasion security.

Such a spherical shape or a uniform particle shape can be advantageous for use in fixed-bed adsorbers because of the resultant better bed in the adsorber container compared with irregularly coarsely ground granules or pellets in rod form.

In general it is possible, to improve the filtration behaviour of the suspensions, to use customary measures which improve filtration, as are described, for example, in Solid-Liquid Filtration and Separation Technology, A. Rushton, A. S., Ward R. G., Holdich, 2nd edition 2000, Wiley-VCH, Weinheim and also Handbuch der Industriellen Fest/Flüissig-Filtration [Handbook of Industrial Solid/Liquid Filtration], H. Gasper, D. Öchsle, E. Pongratz, 2nd edition 2000, Wiley-VCH Weinheim. For instance, flocculants, for example, can be added to the suspensions.

According to the invention, the suspensions of the finely divided iron oxyhydroxides or iron oxides can also be admixed with conventional pulverulent iron oxyhydroxides or iron oxides or other fillers without reducing the stability of the granules. The respective amounts are determined via the properties of these pulverulent iron oxyhydroxides or iron oxides and the requirements made of the inventive product with respect to its mechanical stability and abrasion strength. Although the addition of pulverulent pigments can generally reduce the mechanical strength of the inventive products, filtration of the finely divided suspensions is facilitated. Those skilled in the art working in the respective field of application will be able to determine the optimum mixing ratio for the application by only a few preliminary experiments.

In addition to, or instead of, the iron oxyhydroxides, iron carbonates can also be used.

The inventive products can be subjected to a drying in air, and/or in vacuum, and/or in the drying cabinet and/or on belt dryers or by spray drying, preferably at temperatures of −25 to 250° C., particularly preferably at 60 to 120° C. The drying is expediently performed at temperatures up to 250° C. Vacuum drying or freeze drying of the material is also possible.

The inventive products preferably have a residual water content of less than 50% by weight.

Products available by the above described methods can then be further comminuted, for example by crushing or grinding. Since the products, on their first contact with water, for example during the first filling of a freshly charged adsorber apparatus with water, comminute autogenously, however, this will not generally be necessary. In this case a random particle size distribution is produced, but no particles of a size which are significantly discharged from the adsorber by the flowing medium.

It is possible to dispense completely with a separate granulation, as would be necessary, however, when conventional iron oxyhydroxides are used in the form of (free-flowing) powders, either with the aid of foreign binders, or very high linear forces during compacting.

Although binders which are known to all those skilled in the art can be used to consolidate the granules, the inventive granules have excellent stability even without the use of binder.

The invention also relates to the use of the granules for removing pollutants and/or heavy metals such as phosphates, and compounds of antimony, beryllium, selenium, tellurium, sulphur, cyanide and arsenic from flowable media such as gases and/or liquids such as water or wastewater. Odour substances are also adsorbed.

The granules are particularly preferably used for removing arsenic compounds from water or wastewater.

On the basis of numerous experiments, it has been found that by means of the inventive granules, ions isostructural with arsenic ions can also be adsorbed, for example phosphate, antimonate, molybdate, chromate, tungstate, vanadate.

A preferred use in this technical field is the decontamination of water, in particular drinking water. Very recently, particular attention has been devoted to the removal of arsenic from drinking water. The inventive granules are outstandingly suitable for this purpose, since even the low limit values established by the U.S. authority EPA can not only be achieved but even bettered by the use of the inventive granules.

The granules are preferably used for removing arsenic compounds from water or wastewater in water treatment systems such as cartridges.

The invention will be described in more detail on the basis of the examples hereinafter without restricting the invention thereto.

EXAMPLES

Example 1

76 m$^3$ of solution having 107 g/l of $Fe_2(SO_4)_3$ were heated at 50° C. and then precipitated in the course of 61 min using approximately 15 m$^3$ of NaOH solution (300 g/l) with simultaneous gas introduction with 1500 m$^3$/h of air to a final pH of 9.2. After the completion of addition, the batch was further stirred for 22 min with gas introduction. The batch was washed on a filterpress to a filtrate conductivity <1000 μS/cm, the filterpastes were forced through a paste former onto a belt dryer and dried. The particle fraction 0.5-2 mm was studied.
BET: 326 m$^2$/g;
Abrasion (abrasion test): 2.4%;
Turbidity (turbidity test) after 2 passages: 250 FNU;
Turbidity (turbidity test) after 5 passages: 135 FNU;
Water content: 9%;
Bulk density: 0.94 g/cm$^3$;
Phase analysis: main constituent—FeOOH.
As(V) adsorption after 120 min: 59.3%;
$Cd^{2+}$ adsorption after 120 min: 54.2%; $c_0$=2.4 mg/l; c (120 min)=1.1 mg/l.
$V^{5+}$ adsorption after 120 min: 33.3%; $c_0$=2.4 mg/l; c (120 min)=1.6 mg/l.
Flow test: flows.

Example 1A

A portion of the washed filterpaste was spray dried using a 0.8 mm nozzle. This gave a very narrow particle size distribution mainly between 30 and 200 μm: D(v,0.1)=58.97 μm; D[3.2]=91.36 μm.
BET: 326 m$^2$/g.
Turbidity (turbidity test) after 2 passages: 28 FNU;
Turbidity (turbidity test) after 5 passages: 16 FNU;
Water content: 22.3%;
Bulk density: 1.00 g/cm$^3$;
As(V) adsorption after 120 min: 96.4%;

| | Flow test: flows. | | | | | |
|---|---|---|---|---|---|---|
| | As content in the filtrate [μg/l] after x min of contact time | | | | | |
| Example | Initial | 5 min | 10 min | 30 min | 60 min | 120 min | 360 min |
| Example 1 | 2700 | 2300 | 2200 | 1800 | 1400 | 1100 | 510 |
| Example 1A | 2500 | 1500 | 960 | 440 | 180 | 90 | 30 |

Example 2

76 m$^3$ of solution having 106.3 g/l of $Fe_2(SO_4)_3$ were heated to 45° C. and then precipitated in the course of 50 min using approximately 13 m$^3$ of NaOH solution with simultaneous gas introduction at 1500 m$^3$/h of air to a final pH of 4.7. On completion of addition, the batch was further stirred for 28 min with gas introduction. A portion of the batch was washed on a filterpress to a filtrate conductivity <1000 μS/cm, the filterpastes were forced through a paste former (having 6.5 mm perforated sheet) onto a belt dryer and dried. The particle fraction 0.5-2 mm was studied.
BET: final sample: 185 m$^2$/g
Abrasion value (abrasion test): 4.7%;
Water content: 6.0%;
Bulk density: 0.94 g/cm$^3$;
As(V) adsorption after 120 min: 63.0%;
Phase analysis: main constituent=FeOOH;
Flow test: flows.

Example 2A

A portion of the washed filterpaste was mixed up to form a suspension containing 9.5% solids and dried via a nozzle spray dryer using a 0.8 mm nozzle.
BET: 326 m$^2$/g.
Water content: 16.9%;
Bulk density: 1.08 g/cm$^3$;
Turbidity (turbidity test) after 2 passages: 276 FNU;
Turbidity (turbidity test) after 5 passages: 76 FNU;
As(V) adsorption after 120 min: 98.8%;

$V^{5+}$ adsorption after 120 min: 54.2%; $c_0$=2.4 mg/l; c (120 min)=1.1 mg/l.

Flow test: flows.

| Example | Initial | As content in the filtrate [μg/l] after x min of contact time | | | | | |
|---|---|---|---|---|---|---|---|
| | | 5 min | 10 min | 30 min | 60 min | 120 min | 360 min |
| Example 2 | 2700 | 2400 | 2200 | 1800 | 1400 | 1000 | 290 |
| Example 2A | 2700 | 1800 | 1400 | 740 | 280 | 70 | <10 |

Example 3

7.5 l of an NaOH solution (100 g/l) are charged, heated with stirring to 70° C. and, in the course of 30 min, admixed with 13.5 l of an FeClSO$_4$ solution (100 g/l) to pH 5. The batch was further stirred for 30 min. A 5 l suspension is washed on the suction filter to a conductivity of <1000 μS/cm and then dried at 75° C. The dried solids are forced through a 2 mm sieve, and the fines fraction <0.5 mm is sieved off.
  BET: 304 m$^2$/g
  Abrasion value (abrasion test): 1.1%;
  Turbidity (turbidity test) after 2 passages: 167 FNU;
  Turbidity (turbidity test) after 5 passages: 152 FNU;
  Water content: 11.4%;
  Bulk density: 1.0 g/cm$^3$;
  As(V) adsorption after 120 min: 64.3%;
  Flow test: flows;

Phase: possibly poorly crystalline δ-FeOOH.

| | Initial | As content in the filtrate [μg/l] after x min of contact time | | | | | |
|---|---|---|---|---|---|---|---|
| | | 5 min | 10 min | 30 min | 60 min | 120 min | 360 min |
| Example 3 | 2800 | 2500 | 2300 | 1800 | 1500 | 1000 | 240 |

Example 4

12.2 l of an Fe$_2$(SO$_4$)$_3$ solution (107 g/l) are charged, heated with stirring at 70° C. and, in the course of 30 min, admixed with 9.0 l of an NaOH solution (100 g/l) to pH 5. The batch was further stirred for 30 min. A 5 l suspension is washed on the suction filter to a conductivity of <1000 μS/cm and then dried at 75° C. The dried solids are forced through a 2 mm sieve, the fines fraction <0.5 mm is sieved off.
  BET: 312 m$^2$/g;
  Abrasion value (abrasion test): 0.7%;
  Turbidity (turbidity test) after 2 passages: 135 FNU;
  Turbidity (turbidity test) after 5 passages: 139 FNU;
  Water content: 12.7%;
  Bulk density: 0.89 g/cm$^3$;
  As(V) adsorption after 120 min: 81.4%;
  Flow test: flows;

Phase: X-ray amorphous.

| | Initial | As content in the filtrate [μg/l] after x min of contact time | | | | | |
|---|---|---|---|---|---|---|---|
| | | 5 min | 10 min | 30 min | 60 min | 120 min | 360 min |
| Example 4 | 2800 | 2500 | 2100 | 1600 | 1100 | 520 | 60 |

Example 5

956 l of deionized water were charged into the stirred reactor, with stirring, 280 kg of an FeClSO$_4$ solution (having 40.73% FeClSO$_4$) were added, and the solution was heated at 50° C. The solution was then precipitated with NaOH (100 g/l) to pH 5.0 at 25-30 kg/min and further stirred for 30 min. The suspension was washed on a filterpress to a conductivity of <1000 μS/cm and then dried in the circulated air drying cabinet at 75° C. The dried solids are forced through a 2 mm sieve, and the fines fraction <0.5 mm is sieved off.
  BET: 334 m$^2$/g;
  Abrasion value (abrasion test): 3.6%;
  Turbidity (turbidity test) after 2 passages: 219 FNU;
  Turbidity (turbidity test) after 5 passages: 330 FNU;
  Water content: 6.5%;
  Bulk density: 0.51 g/cm$^3$;
  As(V) adsorption after 120 min: 97.3%; flow test: flows;

Phase: possibly poorly crystallized δ-FeOOH.

| | Initial | As content in the filtrate [μg/l] after x min of contact time | | | | | |
|---|---|---|---|---|---|---|---|
| | | 5 min | 10 min | 30 min | 60 min | 120 min | 360 min |
| Example 5 | 2600 | 1900 | 1700 | 950 | 430 | 70 | 10 |

Summary table

| Example | 1 | 1A | 2 | 2A | 3 | 4 | 5 |
|---|---|---|---|---|---|---|---|
| BET m$^2$/g | 326 | 326 | 185 | 326 | 304 | 312 | 334 |
| Abrasion in % by the abrasion test | 2.4 | — | 4.7 | — | 1.1 | 0.7 | 3.6 |
| Water content in % | 9 | 22.3 | 6.0 | 16.9 | 11.4 | 12.7 | 6.5 |
| Bulk density in g/cm$^3$ | 0.94 | 1.00 | 0.94 | 1.08 | 1.00 | 0.89 | 0.51 |
| As adsorption (% after 120 min) | 59.3 | 96.4 | 63.0 | 98.8 | 64.3 | 81.4 | 97.3 |
| Turbidity FNU after 2 passages (turbidity test) | 250 | 28 | — | 276 | 167 | 135 | 219 |

-continued

Summary table

| Example | 1 | 1A | 2 | 2A | 3 | 4 | 5 |
|---|---|---|---|---|---|---|---|
| Turbidity FNU after 5 passages (turbidity test) | 135 | 16 | | 76 | 152 | 139 | 330 |
| Turbidity FNU after 6 passages (turbidity test) | 148 | 11 | — | 53 | 135 | 109 | 304 |
| Turbidity FNU after 7 passages (turbidity test) | 126 | 13 | — | 62 | 134 | 120 | 322 |
| Turbidity FNU after 8 passages (turbidity test) | 136 | 13 | — | 54 | 149 | 103 | 478 |
| Turbidity FNU after 9 passages (turbidity test) | 120 | 13 | — | 47 | 151 | 95 | 417 |
| Turbidity FNU after 10 passages (turbidity test) | 124 | 9 | — | 44 | 134 | 85 | 489 |
| Flow test: flows (yes or no) | yes | yes | yes | yes | yes | yes | yes |

FIG. 1 shows the turbidity measurement of the supernatant solution, with increasing abrasion cycles after the turbidity test. The y axis here shows the turbidity unit [FNU], while the x axis shows the number of passages. In the figure, the graphs for commercially conventional Bayoxide® E33 are shown as A, Example 1 as B, Example 1A as C, Example 2A as D, Example 3 as E, Example 4 as F, and Example 5 as G. FIG. 1 shows that Bayoxide® E33 always exhibits an abrasion value and therefore turbidity at a very high level, while the inventive granules exhibit very low turbidity. The inventive products are mentioned as examples.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Granules consisting essentially of iron oxide and/or iron oxyhydroxide which have a turbidity by the turbidity test specified in the description of <600 FNU.

2. The granules according to claim 1, wherein the granules have a turbidity by the turbidity test specified in the description of <300 FNU.

3. The granules according to claim 1, wherein the granules have an abrasion value by the abrasion test specified in the description of <10%.

4. The granules according to claim 3, wherein the granules have an abrasion value by the abrasion test specified in the description of <5%.

5. The granules according to claim 1, wherein the granules have α-,β-, γ- and/or δ-FeOOH phases and/or $Fe(OH)_2$ phases, ferrihydrite phases and also mixed and intermediate phases of the same.

6. The granules according to claim 1, wherein the granules, in addition to iron oxide and/or iron oxyhydroxides, comprise iron carbonates and/or in that the iron oxide and/or iron oxyhydroxide are solidified with oxides and/or /(oxy)hydroxides of the elements Al, Mg, Ti.

7. The granules according to claim 1, wherein the granules have a water content of <50%.

8. The granules according to claim 1, wherein the granules have a particle size of 0.01 to 5 mm.

9. The granules according to claim 1, wherein the granules are produced by spray drying and have a particle size of <0.3 mm.

10. The granules according to claim 1, wherein the granules have a BET surface area measured by the carrier gas method ($He:N_2$=90:10) by the one-point method as specified in DIN 66131 (1993) of >100 m²/g.

11. The granules according to claim 1, wherein the granules are flowable by the flow test specified in the description.

12. The granules according to claim 1, wherein the granules have an arsenic adsorption by the arsenic adsorption test of >55%.

13. Method of removing pollutants and/or heavy metals from flowable media using the granules according to one of the claims 1 to 12, wherein the granules are placed into water a treatment system and contacted with the flowable media.

14. The process of using of the granules according to one of claims 1 to 12 to remove pollutants and/or heavy metals from water or wastewater, wherein the granules are placed into a water treatment system and contacted with the water or wastewater.

15. The process of using according to claim 14, wherein the pollutants and/or heavy metals are phosphates, compounds of antimony, beryllium, selenium, tellurium, sulphur, cyanide and/or arsenic.

16. The process of using according to claim 15, wherein the water treatment system is a cartridge or adsorber apparatus.

17. The granules according to claim 1, wherein the granules have a turbidity by the turbidity test specified in the description of <200 FNU.

18. The granules according to claim 4, wherein the granules have an abrasion value by the abrasion test specified in the description of <1.5%.

19. The granules according to claim 7, wherein the flowable media is granules have a water content of <20%.

20. The granules according to claim 8, wherein the granules have a particle size of from 0.1 to 1 mm.

21. The granules according to claim 9, wherein the granules are produced by spray drying and have a particle size of <0.2 mm.

22. The granules according to claim 10, wherein the granules have a BET surface area measured by the carrier gas method ($He:N_2$=90:10) by the one-point methodas specified in DIN 68131 (1993) of >250 m²/g.

23. The granules according to claim 12, wherein the granules have an arsenic adsorption by the arsenic adsorption test of >80%.

24. The method according to claim 13, wherein the pollutants and/or heavy metals are phosphates, compounds of antimony, beryllium, selenium, tellurium, sulphur, cyanide and/or arsenic.

25. The method according to claim 13, wherein the flowable media is gas and/or water and/or wastewater.

26. The method according to claim 13, wherein the water treatment system is a cartridge or adsorber apparatus.

* * * * *